United States Patent
Smith, III

[11] Patent Number: 5,692,538
[45] Date of Patent: Dec. 2, 1997

[54] UNDERSEA HYDRAULIC COUPLING MEMBER

[75] Inventor: Robert E. Smith, III, Missouri City, Tex.

[73] Assignee: National Coupling Inc., Stafford, Tex.

[21] Appl. No.: 310,156

[22] Filed: Sep. 21, 1994

[51] Int. Cl.$^6$ ............................................. F16K 21/02
[52] U.S. Cl. ................ 137/513.3; 137/538; 137/543.23; 137/614.2; 251/149.8
[58] Field of Search ........................ 137/469, 513.3, 137/538, 540, 543.23, 614.05, 614.2; 251/149.8

[56] References Cited

U.S. PATENT DOCUMENTS

| | | | |
|---|---|---|---|
| 1,913,982 | 6/1933 | Fox . | |
| 1,944,124 | 1/1934 | Goodman | 285/175 |
| 2,320,339 | 6/1943 | Buttner | 137/469 |
| 2,396,123 | 3/1946 | Phillips | 285/973 |
| 2,471,237 | 5/1949 | Pasturczak | 284/19 |
| 2,480,108 | 8/1949 | Barker | 210/164 |
| 2,727,759 | 12/1955 | Elliott | 284/18 |
| 2,730,380 | 1/1956 | Espy et al. | 285/19 |
| 2,757,684 | 8/1956 | Ulrich | 137/515 |
| 2,793,656 | 5/1957 | Frain et al. | 137/469 |
| 3,003,797 | 10/1961 | Gage | 286/30 |
| 3,017,124 | 1/1962 | Knight | 137/513.3 X |
| 3,056,423 | 10/1962 | Lieser | 137/493.7 |
| 3,116,944 | 1/1964 | Parker | 285/332.2 |
| 3,147,015 | 9/1964 | Hanback | 277/205 |
| 3,210,099 | 10/1965 | Franck | 285/190 |
| 3,215,161 | 11/1965 | Goodwin et al. | 137/614.04 |
| 3,291,152 | 12/1966 | Comer | 137/614.04 |
| 3,422,864 | 1/1969 | Allinquant | 141/347 |
| 3,498,324 | 3/1970 | Breuning | 137/614.04 |
| 3,618,690 | 11/1971 | Johnson | 137/514.7 |
| 3,653,588 | 4/1972 | Driebelbis | 137/513.3 X |
| 3,730,221 | 5/1973 | Vik | 137/614 |
| 3,917,220 | 11/1975 | Gilmore | 251/86 |
| 3,981,479 | 9/1976 | Foster et al. | 251/63.6 |
| 4,080,988 | 3/1978 | Robertson | 137/513.3 |
| 4,269,226 | 5/1981 | Allread | 137/614 |
| 4,460,156 | 7/1984 | Hazelrigg et al. | 251/149.3 |
| 4,589,495 | 5/1986 | Langer et al. | 166/383 |
| 4,597,413 | 7/1986 | Buseth | 137/614.04 |
| 4,637,470 | 1/1987 | Weathers et al. | 166/344 |
| 4,691,620 | 9/1987 | Kao | 92/80 |
| 4,694,859 | 9/1987 | Smith, III | 137/614.04 |
| 4,703,774 | 11/1987 | Seehausen | 137/614.04 |
| 4,709,726 | 12/1987 | Fitzgibbons | 137/614.04 |
| 4,754,780 | 7/1988 | Smith, III | 137/614.04 |
| 4,768,538 | 9/1988 | Mintz et al. | 137/15 |
| 4,799,512 | 1/1989 | Sarson | 137/614.04 |
| 4,813,454 | 3/1989 | Smith, III | 137/614.04 |
| 4,817,668 | 4/1989 | Smith, III | 137/614.04 |
| 4,832,080 | 5/1989 | Smith, III | 137/614.04 |
| 4,834,139 | 5/1989 | Fitzgibbons | 137/614.04 |
| 4,858,648 | 8/1989 | Smith, III | 137/614.04 |
| 4,884,584 | 12/1989 | Smith, III | 137/614.04 |
| 4,900,071 | 2/1990 | Smith, III | 285/379 |
| 4,915,419 | 4/1990 | Smith, III | 285/26 |
| 4,924,909 | 5/1990 | Wilcox | 137/614.05 |
| 5,015,016 | 5/1991 | Smith, III | 285/108 |
| 5,029,613 | 7/1991 | Smith, III | 137/614.04 |
| 5,052,439 | 10/1991 | Smith, III | 137/614.04 |
| 5,099,882 | 3/1992 | Smith, III | 137/614.04 |
| 5,255,699 | 10/1993 | Herzan et al. | 137/614.05 |
| 5,339,861 | 8/1994 | Smith, III | 137/614.04 |
| 5,365,972 | 11/1994 | Smith, III | 251/149.8 |

*Primary Examiner*—John Rivell
*Attorney, Agent, or Firm*—Arnold, White & Durkee

[57] ABSTRACT

An undersea hydraulic coupling member is disclosed having angled flow ports to prevent ingress of debris into the hydraulic lines, and having a bleed passage to allow trapped hydraulic fluid to bleed off when the coupling members are disconnected. The poppet valve in combination with the angled flow ports helps keep the hydraulic system clear of debris when the members are disconnected.

11 Claims, 1 Drawing Sheet

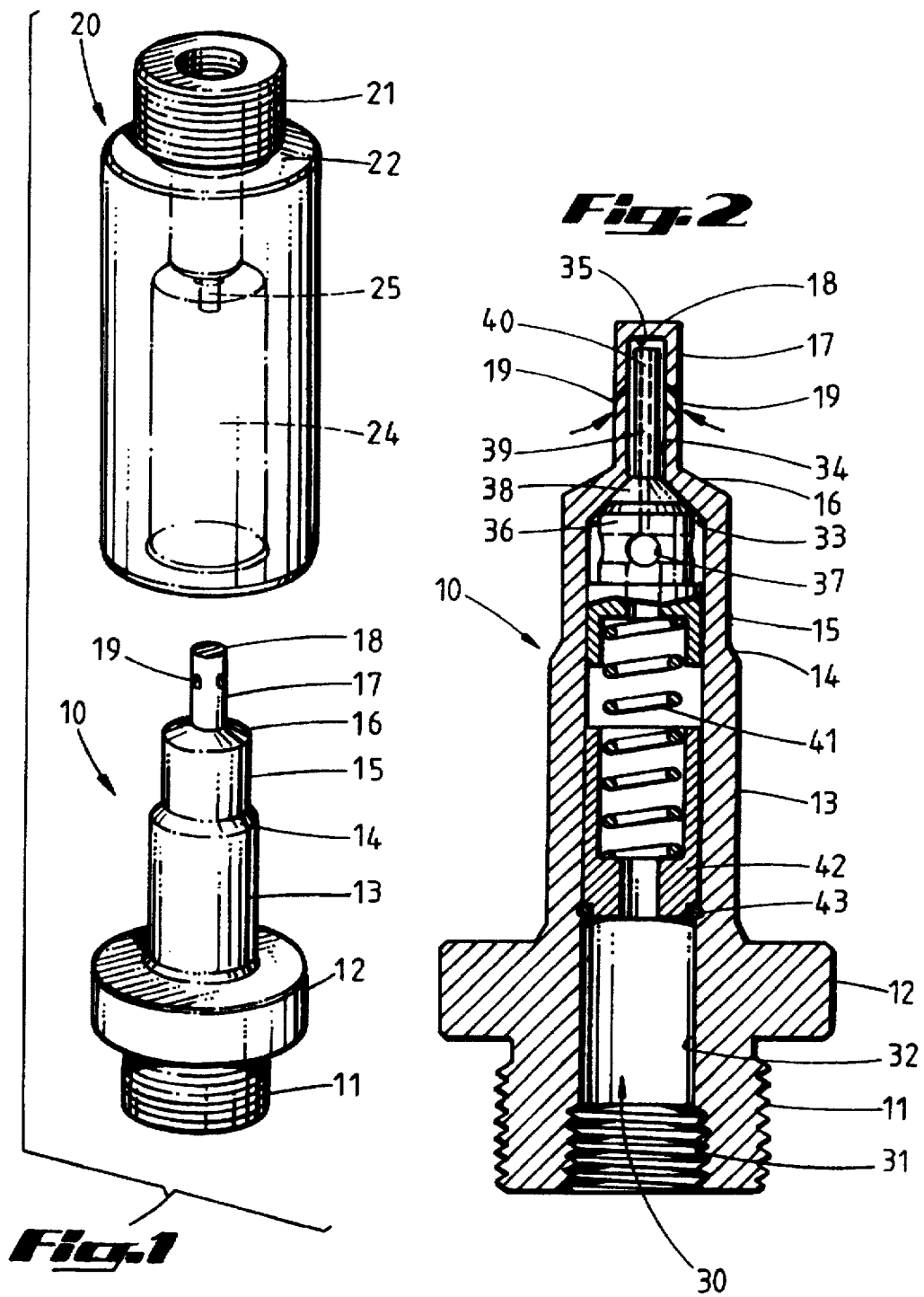

5,692,538

UNDERSEA HYDRAULIC COUPLING MEMBER

BACKGROUND OF THE INVENTION

1. Field of the Invention

This invention relates in general to hydraulic couplings, and specifically to hydraulic couplings used in undersea drilling and production applications. More particularly, this invention involves a hydraulic coupling member having flow ports configured to prevent ingress of debris and a bleed passage to vent trapped hydraulic fluid in the lines when the coupling is disconnected.

2. Description of the Related Art

Subsea hydraulic couplings are old in the art. The couplings generally consist of a male member and a female member with sealed fluid passageways connected therebetween. The female member generally is a cylindrical body with a relatively large diameter longitudinal bore at one end and a relatively small diameter longitudinal bore at the other. The small bore facilitates connections to hydraulic lines, while the large bore seals and slidingly engages the male member of the coupling. The male member includes a cylindrical portion at one end having an outer diameter approximately equal to the diameter of the large bore of the female member of the coupling. The male member also includes a connection at its other end to facilitate connection to hydraulic lines. When the cylindrical portion of the male member is inserted into the large bore of the female member, according to various embodiments of the device, fluid flow is established between the male and female members. Couplings of this type are shown in U.S. Pat. No. 4,694,859 to Robert E. Smith III, and other patents owned by National Coupling Co., Inc. of Stafford, Tex.

In undersea drilling and production applications, the male member of the coupling may be connected to a manifold plate or other securement at a subsea location at the inside or outside of a well bore. In many cases, the male members are positioned so that the end or leading face of each member points vertically up from the sea floor. The female members, which also may be secured to a manifold plate, are moved into position over the male members and then lowered onto the male members by a diver or subsea vehicle. When the female members are positioned on the male members, hydraulic fluid flow typically is from the female member to the male member of each coupling. In some cases, only the female member of the coupling has a poppet valve.

The poppet valve typically includes a conical valve face which seats, in the closed position, against a valve seat in the coupling member. The poppet valve opens to allow fluid flow, and closes against the valve seat within the bore to arrest the flow. Generally, the poppet valve is spring biased to the closed position. The valve may include a valve actuator which may be a nose or stem extending from the apex of the valve face along the longitudinal axis of the poppet valve.

Frequently, wellbores in which the couplings are positioned are full of debris. The male member, which remains subsea when the coupling is disconnected, is subject to debris accumulating in flow passages. The flow passages in the male member may be directly across the gap between the valve face and the valve seat, as shown in U.S. Pat. No. 4,694,859. Or as shown in U.S. Pat. Nos. 4,754,780 and 5,099,882 to 4,832,080 to Robert E. Smith III, hydraulic flow may be radially between the members. Either configuration may be subject to ingress of debris. The debris may contaminate the hydraulic fluid or cause wear to the seals and sealing surfaces in the hydraulic couplings and hydraulic system.

In emergency situations, for example, storms, hurricanes, etc., the coupling members may be quickly disconnected and one of the members, typically the female member, removed from the subsea location. In these situations, problems may arise as a result of trapped hydraulic pressure in the lines to the male coupling member remaining subsea. If hydraulic pressure is trapped subsea, the settings of various valves throughout the hydraulic system have a tendency to change in response to the built up pressure. It is undesirable for the valve settings to unpredictably react to this trapped pressure, so to relieve the pressure it has been suggested to bleed the hydraulic lines that are trapped subsea. Bleeding the lines also is done to avoid damage from blowouts to the hydraulic system. Therefore, if the hydraulic system is in danger of being severed or otherwise damaged due to storms, it then is desirable to disconnect the members and check off or seal one member while allowing the other member, which remains subsea, to bleed off trapped hydraulic pressure. At the same time, it is undesirable for sea water to enter the system through the coupling member that remains subsea.

SUMMARY OF THE INVENTION

The present invention resides in an undersea hydraulic coupling member having angled flow passages in the body of the male member to help prevent ingress of debris. Hydraulic pressure through the angled flow ports pushes a poppet valve open in the male member. When disconnected, the poppet valve closes and the trapped hydraulic fluid in the lines leading to the member bleeds off through a bleed hole in the poppet valve. The flow of hydraulic fluid through the bleed hole and around the poppet aids in flushing out any debris collecting in the flow ports.

BRIEF DESCRIPTION OF THE DRAWINGS

FIG. 1 is a perspective view of a male member and a female member according to the present invention.

FIG. 2 is section view of a male member of a coupling according to a preferred embodiment of the present invention.

DETAILED DESCRIPTION OF THE PREFERRED EMBODIMENTS

The coupling of the present invention includes a male member 10 and female member 20. As shown in FIG. 1, the male member 10 typically faces upwardly form the subsea floor and the female member may be positioned on the male member. The male member is commonly attached to one manifold plate, while the female member is attached to an opposing plate so as to face the male member and align with it. The male and female members may be attached to the manifold plates using various means, such as set screws or threads. Techniques for attaching the members to such manifold plates are well known to those skilled in the art. The male member 10 includes a threaded handle 11 for connection to a manifold plate or other securement means inside or outside a wellbore. Shoulder 12 terminates at first section 13 of the cylindrical probe wall, which is adapted for sliding engagement with the female member. The probe wall of the male member preferably is stepped and includes several variations in its diameter. In a preferred embodiment, first section 13 of the probe wall terminates at tapered shoulder 14, which then adjoins second section 15 of the probe wall. The second section 15 is narrower in diameter than the first section 13 of the probe wall. The second section 15 of the probe wall terminates at tapered shoulder 16 which provides a further reduction in the diameter of the probe wall. Adjoining tapered shoulder 16 is the third section 17 of the probe wall having a narrower diameter and terminating at male member face 18. Leading face 18 of the male member contacts the valve actuator 25 of the female member when the male member is fully inserted into the receiving chamber 24 in the female member. The contact between the leading face 18 and the valve actuator 25 opens the valve actuator 25 in the female member to allow passage of hydraulic fluid between the coupling members.

In the third section 17 of the male member probe wall, angled passages 19 are provided. These angled passages or holes are preferably 1/16 inch in diameter and are spaced at regular intervals around the circumference of the third section 17 of the probe wall. The passages 19 are angled, as shown in FIG. 2, to prevent ingress of debris when the female member is disconnected and the male member remains subsea.

Referring again to FIG. 1, the female member 20 includes a threaded end 21 for connection to a manifold plate, a shoulder 22 and a body 23 with a receiving chamber 24 therein. Preferably, the female member includes a poppet valve with a valve actuator 25 extending therefrom which opens upon mutual contact with a valve actuator or stem on the male member 10.

Now referring to FIG. 2, a cross section of a preferred embodiment of the male member is shown. The male member includes an internal bore 30 which terminates at surface 35. At one end of the bore is a threaded passage 31 for connection to a hydraulic line. Adjacent and inboard of the threaded section is a cylindrical passageway 32 extending longitudinally within the male member body and terminating at valve seat 33. The valve seat 33 is an inclined shoulder, terminating at cylindrical passageway 34 having a reduced diameter. Cylindrical passageway 34 terminates at closed surface 35. Angled passageways 19 allow fluid communication between the passage 34 and external surface of the male member.

The various parts of the valve assembly of the male member are valve head 36 with apertures 37 extending therethrough and valve face 38 which is conical in shape and dimensioned to seat within the valve seat 33 at the end of the male member bore. Extending from the valve face 38 is valve stem 39 which is cylindrical in shape and extends along the longitudinal axis of the male member. The valve stem 39 is located at the apex of the conical valve face. Helical valve spring 41 is used to urge the valve face 38 into a closed position against the valve seat 33. The helical valve spring is located within the cylindrical passageway 32 and anchored at hollow spring collar 42 which is held in place by collar clip 43 at the inner surface of the cylindrical passageway 32. The opposite end of the helical valve spring is in contact with the valve body 36, urging the valve into a closed position.

A bleed hole 40 extends through the valve stem 39 to allow trapped fluid under pressure to bleed off through the bleed hole when the female member is removed from the male member and the male member poppet valve is closed. The end of the valve stem 39 may or may not touch surface 35 inside the male member. Trapped fluid that bleeds through the passageway 40 moves out of the male member through angled passages 19. If the bleed pressure is high enough, the flow through the bleed hole causes a "jet" action against surface 35 which tends to open the valve slightly, urging valve face 38 away from the conical valve seat 33. This "jet" action aids in flushing out any debris collected in the angled flow ports 19. This flushing action during bleeding of the male member hydraulic lines continues until the built up hydraulic pressure subsides.

When the female member is attached to the male member, the flow of hydraulic fluid typically is from the female member to the male member. Fluid passes through a typical female member and enters the angled ports in the male member. The hydraulic pressure through the angled ports 19 and against the face 38 of the poppet valve urges the poppet valve open to allow fluid to flow through the male member. When the male member and female member are disconnected, the poppet valve closes as spring 41 urges the valve face 38 against the valve seat 33. As discussed above, the poppet valve may open slightly if the bleed pressure is high enough to overcome the spring force. The poppet valve in combination with the angled flow ports in the male member body help prevent ingress of debris, while allowing trapped hydraulic fluid pressure to bleed off. This allows safety valves to close in emergency situations when the hydraulic coupling is uncoupled.

Although variations in the embodiment of the present invention may not each realize all of the advantages of the invention. Certain features may become more important than others in various applications of the device. The invention, accordingly, should be understood to be limited only by the scope of the appended claims.

What is claimed is:

1. A hydraulic coupling member comprising:
   (a) a cylindrical body having a first end and a second end, an outer circumference, and a stepped longitudinal bore terminating at a closed surface at the second end of the body;
   (b) at least two flow ports adjacent the second end and extending between the bore and the outer circumference, the end of the flow port connecting to the bore being above the end of the flow port connecting to the outer circumference when the coupling member is positioned with the second end facing upward;
   (c) a normally closed poppet valve slidable in the bore and having a stem extending therefrom through the bore adjacent the flow ports, the poppet valve being openable in response to hydraulic fluid pressure through the flow ports into the bore; and
   (d) a bleed passage extending through the stem of male member allowing trapped hydraulic fluid to flow from the bore out through the flow ports when the poppet valve is closed.

2. The hydraulic coupling member of claim 1 wherein the bore comprises a larger diameter adjacent the first end, a smaller diameter adjacent the second end and terminating at the closed surface, and a tapered valve seat between the two diameters.

3. The hydraulic coupling member of claim 1 wherein the cylindrical body comprises three progressively smaller diameters from the first end to the second end of the body.

4. The hydraulic coupling member of claim 1 wherein the poppet valve is configured to open slightly when flow from the bore outward through the bleed passage exceeds a predetermined rate.

5. A male member for an undersea hydraulic coupling comprising:
   (a) a body having an outer surface, a first end and a second end, and a bore extending between the first end and a closed surface adjacent the second end;

(b) a plurality of angled flow ports between the bore and the outer surface, the flow ports angled to help prevent ingress of debris when the male member is positioned subsea with the second end higher than the first end; and (c) a slidable valve for controlling fluid flow through the bore and flow ports, the valve biased closed against a valve seat and openable in response to fluid pressure to be urged away from the seat.

6. The male coupling member of claim 5 further comprising a bleed passage extending through the valve for bleeding of hydraulic fluid form the bore out through the flow ports when the valve is closed.

7. The male coupling member of claim 6 wherein the valve is adapted to open when bleeding of hydraulic fluid against the closed surface at the second end of the male member exceeds the bias urging the valve closed.

8. The male coupling member of claim 5 wherein the valve comprises a conical valve face with a stem extending therefrom, the bleed passage extending through the face and stem.

9. A male member for an undersea hydraulic coupling comprising:

(a) a body having an outer surface, a first end and a second end, and a bore extending between the first end and a closed surface adjacent the second end;

(b) a plurality of flow ports between the bore and the outer surface; the flow ports angled to prevent ingress of debris when the male member is positioned subsea;

(c) a slidable valve for controlling fluid flow through the bore and flow ports, the valve biased closed against a valve seat and openable in response to fluid pressure to be urged away from the seat; and (d) a bleed passage extending through the valve for bleeding of hydraulic fluid trapped in the bore when the valve is closed.

10. A male member for an undersea hydraulic coupling comprising:

(a) a body having an outer surface, a first end and a second end, and a bore extending between the first end and a closed surface adjacent the second end;

(b) a plurality of flow ports between the bore and the outer surface;

(c) a slidable valve for controlling fluid flow through the bore and flow ports, the valve biased closed against a valve seat and openable in response to fluid pressure to be urged away from the seat; and (d) a stem extending from the valve, and a bleed passage extending though the stem for bleeding of hydraulic fluid trapped in the bore when the valve is closed.

11. A male member for an undersea hydraulic coupling comprising:

(a) a body having an outer surface, a first end and a second end, and a bore extending between the first end and a closed surface adjacent the second end;

(b) a plurality of flow ports between the bore and the outer surface;

(c) a slidable valve for controlling fluid flow through the bore and flow ports, the valve biased closed against a valve seat and openable in response to fluid pressure to be urged away from the seat; and (d) a bleed passage extending through the valve for bleeding of hydraulic fluid trapped in the bore when the valve is closed; the valve configured to open slightly when the rate of hydraulic fluid bleeding through the bleed passage exceeds a predetermined rate.

* * * * *